Fig. 2.

July 18, 1933.　　　F. C. BIGGERT, JR　　　1,918,318
SHEARING APPARATUS
Filed March 11, 1932　　　4 Sheets-Sheet 4

WITNESSES　　　　　　　　　　　　INVENTOR

Patented July 18, 1933

1,918,318

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

SHEARING APPARATUS

Application filed March 11, 1932. Serial No. 598,193.

This invention pertains to what is commonly referred to in the metal working art as a flying cutter or shear, such as is employed for cutting metal stock into sections of predetermined length, while it is in motion, and relates more particularly to an improved form of a shear of the rotary type.

In shears of this character in order to produce a satisfactory cut, as well as to avoid any impeding of the incoming material or any kicking forward of the severed pieces, it is necessary that the cutting blade be traveling at a peripheral speed which is substantially the same as the linear speed of the material when the cut is made. To provide for this, and also to provide a shear in which cuts of different lengths may be produced, it is necessary to either provide for varying the radii of the cutting blades and for correspondingly varying the speed of the material, or, if the speed of the material is not altered, for varying the rotary speed of the blades, or else it is necessary to provide for varying both the rotary speed of the blades and their peripheral speeds at different instances in their cycle of rotation, so that their peripheral speed at the instant of cutting may be varied to accord with the linear speed of the material while permitting their rotary speed being varied to vary the lengths of the cuts.

The object of this invention, generally stated, is to provide a shear having these latter characteristics, that is, a shear having rotary blades which may be driven at different rotary speeds to vary the length of the cut and in which provision is made for varying the peripheral speeds at different instances in their cycle of rotation whereby they may be adjusted to accord with the linear speed of the material when the cut is made while permitting them to travel at different speeds during the remainder of their cycle of rotation.

A more particular object is to provide a shear of the above-noted character which is capable of producing cuts of widely varying lengths and of operating with satisfaction on material fed to it at widely varying speeds. Another object is to provide a shear which is dependable and sturdy of construction and which is adapted to be adjusted with ease to vary the length of its cuts or to correct its cutting speed while it is either at a standstill or in motion.

Figure 1:
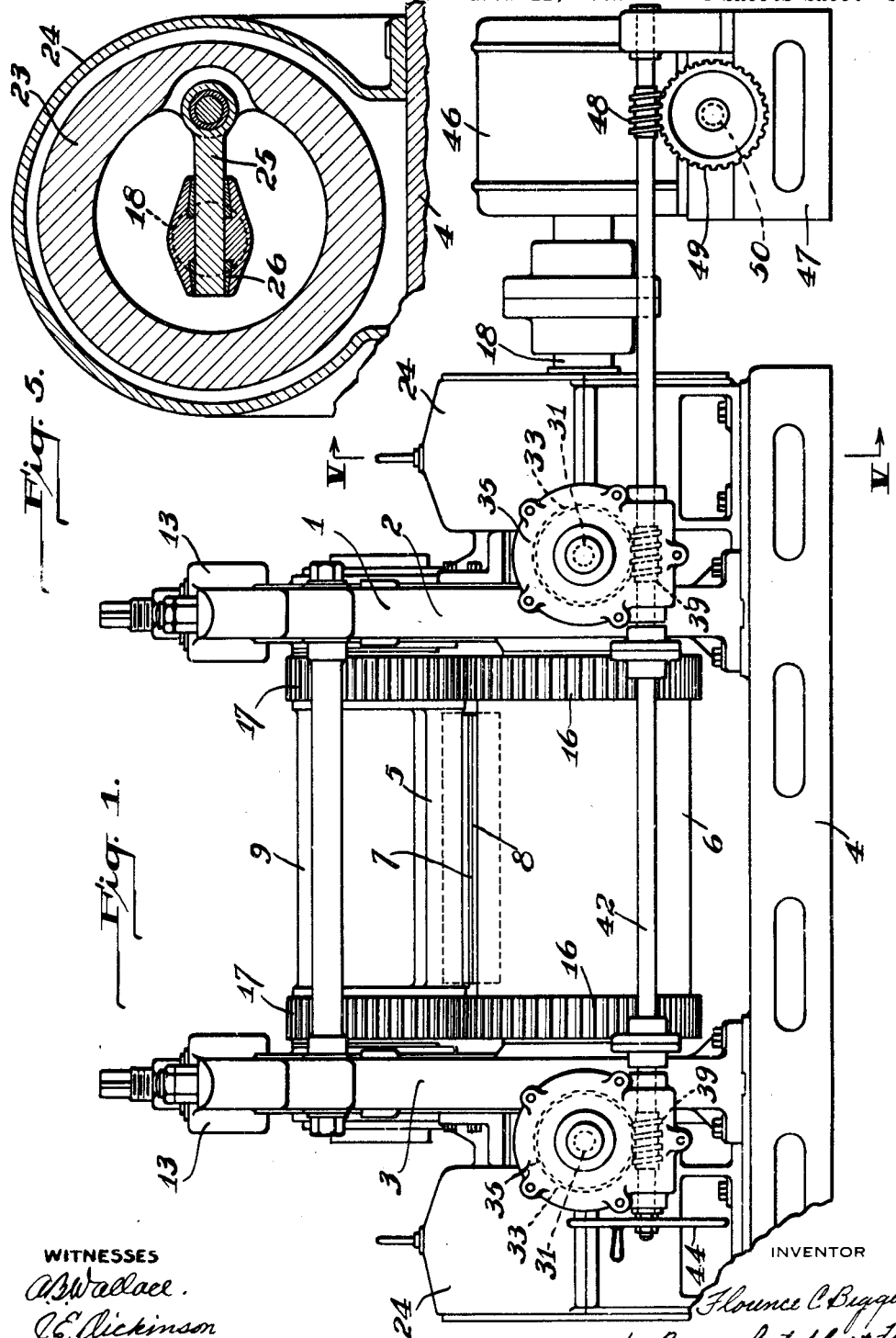
Figure 2:
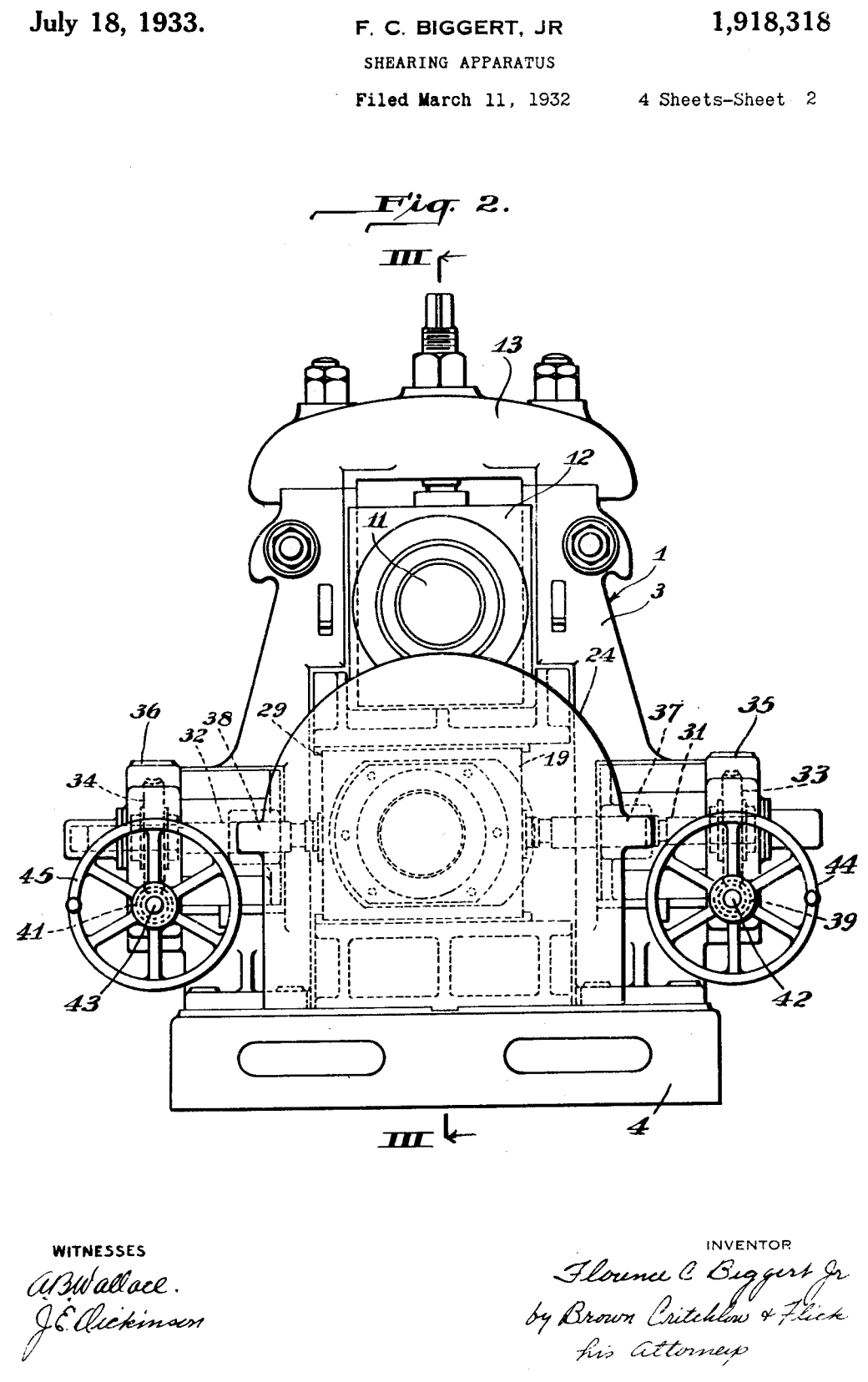
Figure 3:
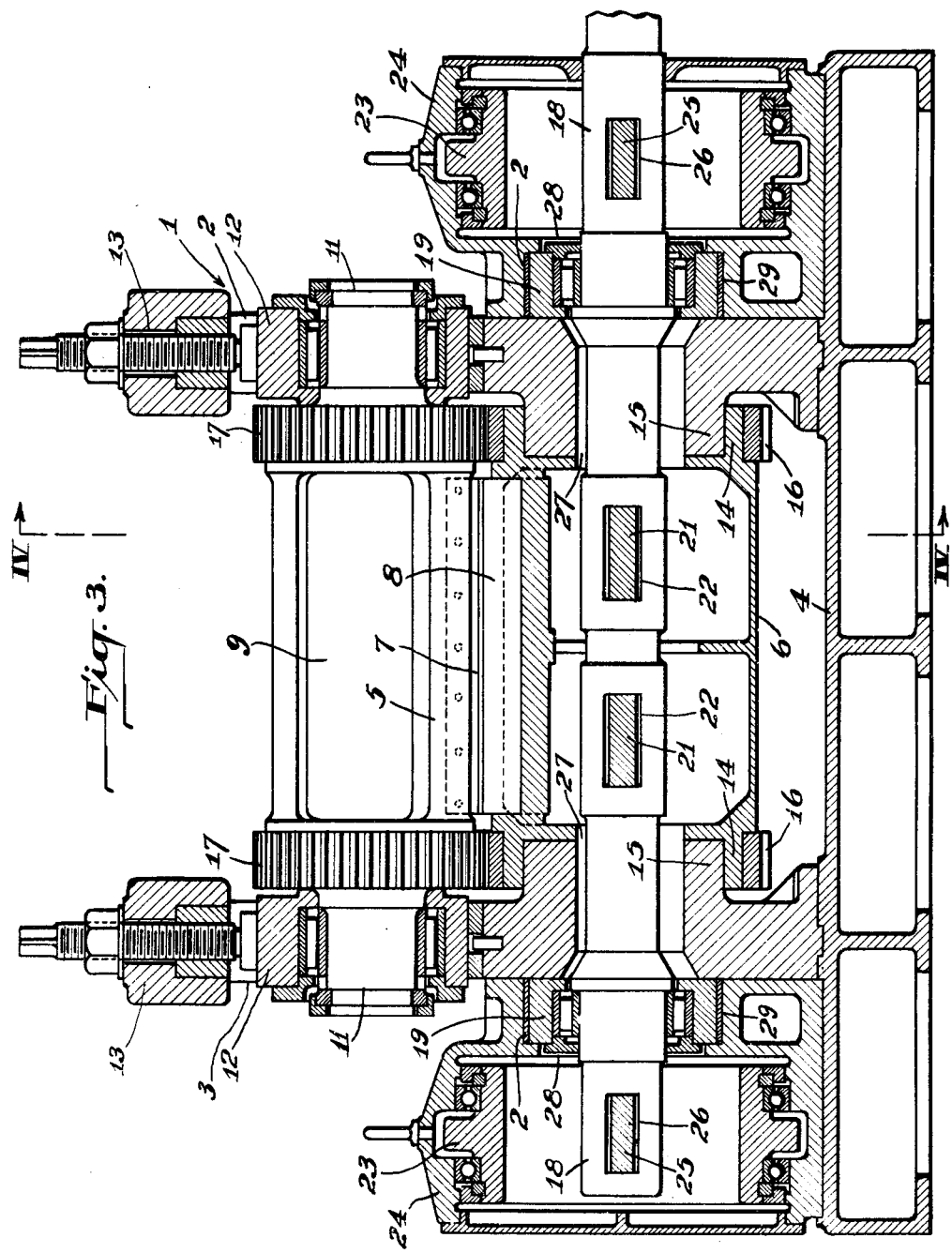
Figure 4:
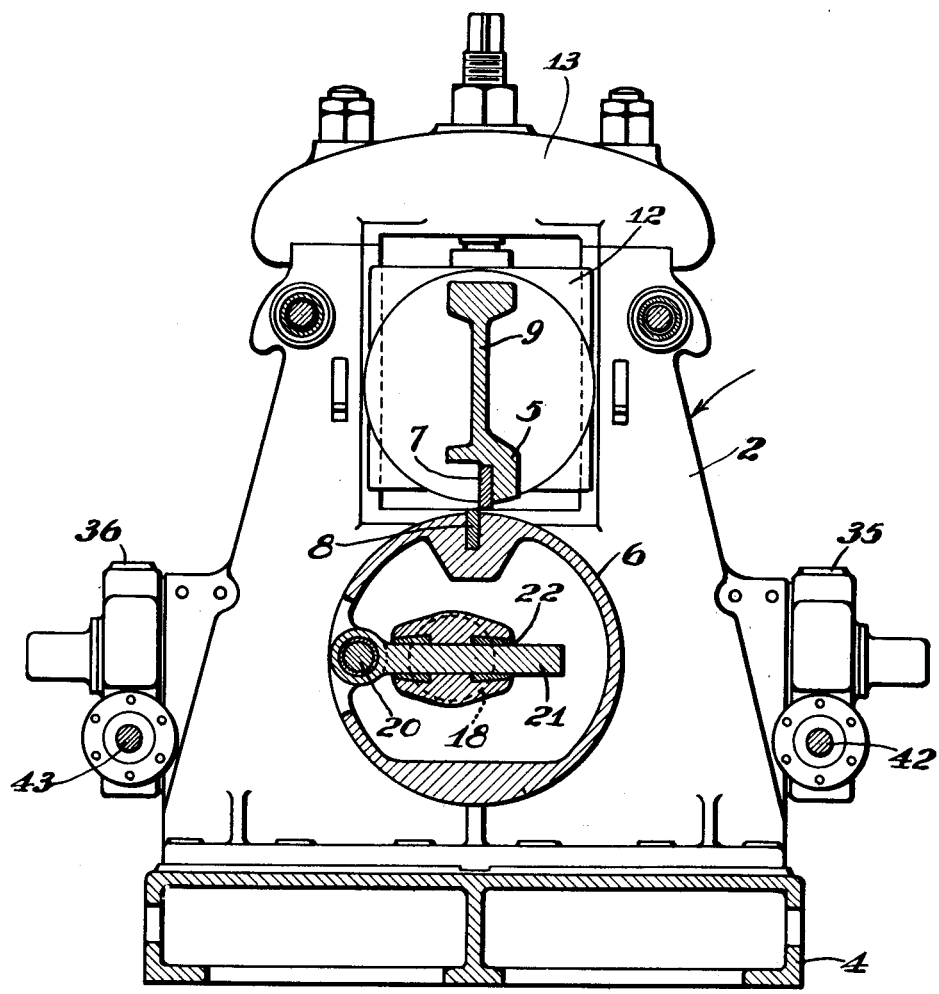

These and various other objects, as well as the other novel features and advantages of the invention, will become apparent when the following detailed description is read in conjunction with the accompanying drawings, of which Fig. 1 is a side elevational view of a shear constituting a single embodiment of the invention; Fig. 2 an end view of the same; Fig. 3 a longitudinal sectional view taken on the line III—III of Fig. 2; Fig. 4 a transverse sectional view taken on the line IV—IV of Fig. 3; Fig. 5 a view similar to Fig. 4 taken on the line V—V of Fig. 1, and Fig. 6 a sectional view of a modified form of shear drum driving connection.

Referring to the drawings, the embodiment of the invention illustrated comprises a frame 1 which consists principally of a pair of uprights 2 and 3 and a base 4. Within these uprights there are arranged in cooperating relation an upper blade carrier 5 and a lower blade carrier 6 which are equipped with coacting cutting blades 7 and 8, respectively, and which are suitably mounted for rotation about fixed axes.

As shown, carrier 5 consists merely of a beam-like frame 9 which is provided at its opposite ends with stub shafts 11 that are rotatably mounted in suitable bearings 12 held in uprights 2 and 3 by conventional bearing heads 13 and by reason of which such carrier is adapted for replacement if desired. The lower carrier 6, unlike the upper carrier. is made in the form of a drum having rim portions 14 at its two ends which are adapted to extend over and rotate upon annular projections 15 provided on uprights 2 and 3 for such purpose. To provide positive and synchronous rotation of the two blade carriers and thereby insure positive cooperation between blades 7 and 8 when the two are rotated, the lower carrier is equipped with gear rings 16 which are rigidly attached to its opposite ends and arranged to engage cooperating gears 17 provided on the upper carrier.

For driving the shear a power shaft 18 is extended through the lower blade carrier, and mounted in bearing 19 provided in uprights 2 and 3. In accordance with the invention in order to allow the carriers to be driven at different rotary speeds to vary the lengths of the cuts and at the same time permit their peripheral speeds being varied so that the speed of the blades will accord with the linear speed of the material when a cut is made, shaft 18 is mounted for adjustment with respect to the axis of carrier 6 and to permit such adjustment of the shaft the latter is connected to the carrier by two slide links 21. In the present machine two links are used to more evenly distribute the strain on the shaft and increase the strength of the structure, and both are pivotally attached at 20 to the shell of carrier 6 at 90° from blade 8 for a purpose which will presently appear and both are extended through openings 22 provided in shaft 18 for their reception.

As will be appreciated with such a drive, the peripheral speed of the blade carriers instead of being uniform, will vary continually during each rotation if shaft 18 is adjusted to a position eccentric to the fixed axis of drum 6. Furthermore, the peripheral speeds of the blades at any instant will be determined by the speed of shaft 18 and by the effective length of links 21 at such instance. The latter, of course, are constantly moving in shaft 18 under such conditions and provide a continually varying driving radius for the lower carrier, the resultant speed of which is imparted to carrier 5 by gears 16 and 17. Hence, if material to be cut is fed through the shear at a constant or uniform speed, the lengths of the cuts may be varied by merely varying the speed of shaft 18 and the peripheral speed of the blades varied to accord with the linear speed of the material at the instant of cutting by adjusting shaft 18 with respect to the axis of carrier 6 in such a way that links 21 have an effective length which will impart to the carriers the desired peripheral speed at that instant.

To counterbalance unbalanced forces which are imposed on shaft 18 when it is eccentrically adjusted with respect to the axis of carrier 6, a pair of balance wheels 23 are provided and mounted in suitable housings 24 attached to uprights 2 and 3 for rotation about axes coinciding in concentric relation with the axis of carrier 6. These wheels, like the carrier, are connected to shaft 18 by slide links 25 which are pivotally attached to them and extended through openings 26 in the shaft, the attachment of these links to the balance wheels being made at points as shown in Fig. 5 which are diametrically opposite to those at which links 21 are attached to the carrier, whereby to provide the balancing effect desired, as will be readily understood.

In order to permit the eccentric adjustment of drive shaft 18, suitable openings 27 and 28 are provided in uprights 2 and 3 and housings 24 respectively, and the bearings 19 are mounted for movement in horizontal openings or guideways 29 formed in housings 24 in which they rest. To effect the adjustment of these bearings, screws 31 and 32 are provided and arranged to engage their opposite vertical faces. For moving these screws they are threadably engaged in the threaded hubs of worm gears 33 and 34 mounted in suitable supports 35 and 36 and are held against turning by splined engagement with guides 37 and 38 through which they are passed. For turning the worm gears 33 and 34 they are engaged with cooperating worms 39 and 41 mounted on shafts 42 and 43 which are in turn provided with hand wheels 44 and 45 for effecting their rotation. Through this provision when it is desired to adjust shaft 18 one of the hand wheels 44 or 45, depending on the adjustment desired, is turned to back its respective screws away from the face of bearing 19 a distance corresponding to the amount of adjustment required and then the opposite hand wheel turned to force the bearing to its newly selected position. To insure shaft 18 being always maintained in parallel relation with the axis of carrier 6, shafts 42 and 43 are extended all the way across the machine and connected with the adjustment screws on the two ends thereof thereby producing the same movement in both bearings at the same time.

With shaft 18 mounted for horizontal adjustment, which to date is considered preferable, it is necessary in order to provide for the widest range of peripheral speed variations permissible for a given speed of shaft 18 to attach links 21 as stated above to carrier 6 at a point spaced 90° peripherally from the point on the carrier where blade 8 is mounted. As will be understood with such form of adjustment, the minimum and maximum peripheral speeds which the shaft will impart to the carriers will occur when the effective lengths of the links 21 are either at a minimum or maximum and this occurs when the links 21 lie in a horizontal plane and their pivoted ends are either at one side of the center of the shaft or the other depending on the position of the shaft with respect to the center of the carrier. Hence, in order to produce cuts at such times and thereby obtain the widest range of adjustment possible the blades must be spaced 90° from the link connections on the carrier. One advantage of this form of shear drive which is a feature of the invention is that with such an arrangement the cut is produced when the blades are neither accelerating nor decelerating, which is the ideal condition for making cuts in moving material, as is well known by those skilled in the art.

Figure 6:
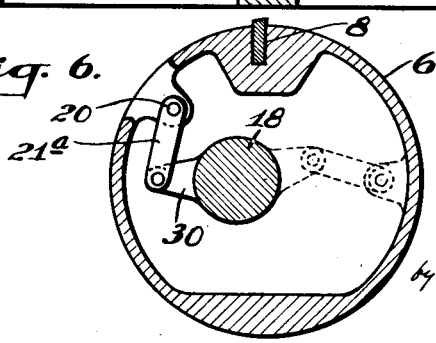

As shown in Fig. 6 the drive for the shear drum may be modified if desired to eliminate the slide connection. In accordance with this latter drive instead of a slide link opening 22 shaft 18 is provided with a crank arm 30, between which and pivot 20 of drum 6 a link 21a is connected. With such an arrangement the pivotal connection and link 21a are so proportioned as to permit the same adjustment of shaft 18 as does the slide link 21 and also provide a similar drive.

For driving the shear a motor 46 is suitably coupled to shaft 18 and mounted in a base 47 in a manner so as to be adjusted in the same fashion as bearings 19. To effect such adjustments and to do so at the same time and with the same operation required to move bearings 19, shafts 42 and 43 are extended over to the motor base and equipped with worms 48 which are arranged to engage worm gears 49 that are in turn mounted similar to the worm gears 33 and 34 and engaged with adjusting screws 50. These are arranged to operate with respect to the motor mounting the same as screws 31 and 32 do with respect to bearings 19 and for that reason, it has not been deemed necessary to show them in detail.

From the foregoing, as will be obvious, the adjustment of the shear may be effected with ease and either when the machine is idle or in motion. To vary the lengths of cuts which it will produce all that is necessary is to vary the speed of motor 46 to give the desired length of cut, which is determined by the rotary speed of shaft 18 or the motor and the speed of the material, and then adjust wheels 44 and 45 until the proper adjustment of shaft 18 has been made to cause blades 7 and 8 to be traveling at the same speed as the material when the cut is made. This may require the shaft bearing adjusted to a position concentric with the axis of carrier 6 which gives a uniform peripheral speed to the blades, or it may require an adjustment between limits of course determined by the adjustment permissible in the machine on either side of each of the carrier axes to give the desired blade speed at the cutting instance. It will also be obvious to those skilled in the art that such a shear is not limited to any one speed of material as the rotary speed of the shear may be varied in the same manner as the material by merely varying the speed of its driving motor which can be done without altering the effect of the other aforementioned adjustable characteristics of the machine.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In a rotary cutter for operating on moving material the combination of a blade carrier mounted for rotation about a fixed axis, a rotary driving element for actuating said carrier, mounted for eccentric adjustment with respect to the axis of the carrier and an adjustable means connecting said driving element to said carrier, said connecting means being so constructed as to vary the speed of said carrier during each revolution as the distance between the center of said driving element and a fixed point on the periphery of said carrier varies as the driving element is rotated.

2. In a rotary cutter for operating on moving material the combination of a blade carrier mounted for rotation about a fixed axis, a power shaft extended therethrough and adapted for driving said carrier, means for eccentrically adjusting said shaft with respect to the axis of the carrier and an adjustable connection between said carrier and shaft for transmitting the motion of the latter to the former.

3. In a rotary cutter adapted for operation on moving material the combination of a blade carrier mounted for rotation about a fixed axis, a power shaft for driving said carrier extended therethrough and mounted for eccentric adjustment with respect to the axis of the carrier, and a connecting link pivotally attached to the carrier and slidably extended through an opening in the shaft for transmitting the motion of said shaft to said carrier.

4. In a rotary cutter adapted for operation on moving material the combination of a blade carrier mounted for rotation about a fixed axis, a cutting blade mounted on said carrier, a power shaft for driving said carrier, said shaft being extended through the carrier and mounted for eccentric adjustment in a horizontal plane with respect to the axis of the carrier, and a connecting link pivotally attached to the carrier at 90° from said cutting blade and slidably extended through an opening in the shaft for transmitting the motion of said shaft to said carrier.

5. In a rotary cutter adapted for operation on moving material the combination of a supporting frame, a blade carrier mounted in said frame for rotation about a fixed axis, a cutting blade mounted in said carrier, a drive shaft extended through said carrier and mounted in said frame for adjustment eccentric to the axis of said carrier, a slide link pivotally connected between the carrier and said shaft for transmitting the motion of the latter to the carrier and balancing means also connected to said shaft for counterbalancing as far as possible unbalanced forces imposed upon said shaft by said carrier.

6. In a rotary cutter adapted for operation on moving material the combination of a supporting frame, a blade carrier mounted in said frame for rotation about a fixed axis, a cutting blade mounted in said carrier, a drive shaft extended through said carrier and mounted in said frame for adjustment eccentric to the axis of said carrier, a slide link pivotally connected between the carrier and said shaft for transmitting the motion of the latter to the carrier, a balance wheel mounted for rotation concentric with said carrier and a slide link pivotally connected between said wheel and said shaft, the connection of said latter link to said balance wheel being made in diametric opposition to the attachment of the first-mentioned link to said blade carrier.

7. In a rotary cutter adapted for operation on moving material the combination of a supporting frame, a blade carrier mounted in said frame for rotation about a fixed axis, a drive shaft for operating said carrier extended therethrough and adjustably mounted in suitable bearings provided in said frame, a slide connection between said carrier and shaft and means for adjusting said bearings to move said shaft with respect to the axis of said carrier.

8. In a rotary cutter adapted for operation on moving material the combination of a supporting frame, a blade carrier mounted in said frame for rotation about a fixed axis, a drive shaft for operating said carrier extended therethrough and mounted in suitable adjustable bearings provided in said frame, means for adjusting said bearings to move said shaft with respect to the axis of said carrier, a motor operably coupled to said shaft and means for moving said motor in the same fashion as said bearings.

9. In a rotary cutter adapted for operation on moving material the combination of a supporting frame, a blade carrier mounted in said frame for rotation about a fixed axis, a drive shaft for operating said carrier extended therethrough and mounted in suitable adjustable bearings provided in said frame, means for adjusting said bearings to move said shaft with respect to the axis of said carrier, a motor operably coupled to said shaft, means for moving said motor in the same fashion as said bearings, and means for insuring said shaft being maintained in parallel relation with the axis of said carrier when it is adjusted.

10. A rotary cutter for operation on moving material comprising a pair of positively connected blade carriers equipped with cooperating cutting blades and mounted for rotation about fixed axes, a driving element for delivering power to one of said carriers mounted for eccentric adjustment with respect to the axis thereof, and a link connection between said element and the carrier to which it delivers power, said connection being adapted to rotate said carrier at speeds varying as the operative length of said link varies as the driving element is rotated.

11. A rotary cutter for operating on moving material comprising a pair of blade carriers equipped with cooperating cutting blade and mounted for rotation about fixed axes, a power shaft adjustably mounted within one of said carriers for effecting the rotation thereof, a slide link connection between said shaft and said latter carrier, means for adjusting said shaft with respect to the axis of the carrier in which it is disposed, and cooperating gears mounted on said carriers for causing them to be driven in synchronism with each other.

12. A rotary cutter for operating on moving material comprising a supporting frame, a pair of blade carriers equipped with cutting blades and mounted for rotation in said frame about fixed axes, a power shaft extended through one of said carriers and adjustably mounted in said frame, a slide link connected to the carrier through which said shaft is extended and it in turn slidably extended through an opening in said shaft, means for adjusting said shaft with respect to the axes of rotation of the carrier in which it is disposed and gears on said latter carrier arranged to mesh with gears provided in the other carrier to provide synchronous rotation of the two carriers.

13. A rotary cutter comprising a supporting frame, a pair of positively connected blade carriers equipped with cooperating cutting blades and mounted in said frame for rotation about fixed axes, a power shaft extended through one of said carriers and adjustably mounted in said frame, a slide connection between said shaft and the carrier in which it is disposed, a pair of balance wheels mounted in said frame at opposite ends of said shaft for rotation about fixed axes coinciding with the axis of rotation of the carrier to which said shaft is connected and slide means connecting said balance wheels to said shaft in a manner to counterbalance any unbalanced forces imposed upon said shaft by said shear carriers when the shaft is adjusted eccentrically to the axis of the carrier in which it is disposed.

14. A rotary cutter comprising a supporting frame, a pair of positively connected blade carriers equipped with cooperating cutting blades mounted in said frame for rotation about fixed axes, a power shaft extended through one of said carriers parallel to the axis thereof and mounted in said frame for adjustment with respect to said axis in a horizontal plane, a slide link pivotally connected to such carrier at a point spaced 90° from the blade mounted thereon and extended through an opening in said shaft, a pair of balance wheels mounted about said shaft for rotation about fixed axes coinciding with the axes of the carrier containing said shaft and a pair of slide links pivotally connected to said balance wheels at points diametrically opposed to the point where said first-mentioned slide link is connected to the carrier and extended through openings in said shaft thereby adapting said wheels to counterbalance any unbalanced forces imposed on said shaft by said blade carriers by reason of said shaft being adjusted eccentrically to the axis of the carrier to which it is connected.

15. In a rotary cutter adapted for operation on moving material the combination of a blade carrier mounted for rotation about a fixed axis, a power shaft for driving said carrier extended therethrough and mounted for eccentric adjustment with respect to the axis of the carrier, and an adjustable connecting link pivotally attached between the carrier and the shaft whereby to transmit the motion of said shaft to said carrier.

FLORENCE C. BIGGERT, Jr.